United States Patent
Hu et al.

(10) Patent No.: US 12,201,964 B2
(45) Date of Patent: Jan. 21, 2025

(54) SYSTEMS AND METHODS FOR HIGH TEMPERATURE SYNTHESIS OF SINGLE ATOM DISPERSIONS AND MULTI-ATOM DISPERSIONS

(71) Applicant: UNIVERSITY OF MARYLAND, COLLEGE PARK, College Park, MD (US)

(72) Inventors: Liangbing Hu, Rockville, MD (US); Yonggang Yao, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 620 days.

(21) Appl. No.: 17/618,959

(22) PCT Filed: Jun. 14, 2020

(86) PCT No.: PCT/US2020/037668
§ 371 (c)(1),
(2) Date: Dec. 14, 2021

(87) PCT Pub. No.: WO2020/252435
PCT Pub. Date: Dec. 17, 2020

(65) Prior Publication Data
US 2022/0241756 A1    Aug. 4, 2022

Related U.S. Application Data

(60) Provisional application No. 62/861,639, filed on Jun. 14, 2019.

(51) Int. Cl.
*B01J 23/46* (2006.01)
*B01J 19/00* (2006.01)
(Continued)

(52) U.S. Cl.
CPC ......... *B01J 23/462* (2013.01); *B01J 19/0013* (2013.01); *B01J 19/121* (2013.01);
(Continued)

(58) Field of Classification Search
CPC .... B01J 23/462; B01J 19/0013; B01J 19/121; B01J 19/126; B01J 21/18; B01J 23/42;
(Continued)

(56) References Cited

U.S. PATENT DOCUMENTS 4,046,712 A    9/1977  Cairns et al.
6,383,972 B1   5/2002  Parmentier et al.
(Continued)

FOREIGN PATENT DOCUMENTS

CN    102856611 A    1/2013
CN    103456969 B    4/2015
(Continued)

OTHER PUBLICATIONS

Fei et al., "General synthesis and definitive structural identification of $MN_4C_4$ single-atom catalysts with tunable electrocatalytic activities," *Nature Catalysis*, 2018, 1: pp. 63-72. (10 pages).
(Continued)

*Primary Examiner* — Patricia L. Hailey
(74) *Attorney, Agent, or Firm* — RowanTree Law Group, PLLC; Frederick F. Rosenberger

(57) ABSTRACT

Disclosed are single atom dispersions and multi-atom dispersions, and systems and methods for synthesizing the atomic dispersions. An exemplary method of synthesizing atomic dispersions includes: positioning a loaded substrate which includes a substrate which is loaded with at least one of: a precursor of an element or a cluster of an element, applying one or more temperature pulses to the loaded substrate where a pulse of the temperature pulse(s) applies a target temperature for a duration, maintaining a cooling
(Continued)

period after the pulse, and providing single atoms of the element dispersed on the substrate after the one or more temperature pulses. The target temperature applied by the pulse is between 500 K and 4000 K, inclusive, and the duration is between 1 millisecond and 1 minute, inclusive.

16 Claims, 12 Drawing Sheets

(51) Int. Cl.
  *B01J 19/12* (2006.01)
  *B01J 21/18* (2006.01)
  *B01J 23/42* (2006.01)
  *B01J 27/24* (2006.01)
  *B01J 37/08* (2006.01)
  *B01J 37/34* (2006.01)

(52) U.S. Cl.
  CPC .......... *B01J 19/126* (2013.01); *B01J 21/18* (2013.01); *B01J 23/42* (2013.01); *B01J 27/24* (2013.01); *B01J 37/08* (2013.01); *B01J 37/346* (2013.01); *B01J 37/349* (2013.01); *B01J 2219/00132* (2013.01); *B01J 2219/00141* (2013.01)

(58) Field of Classification Search
  CPC . B01J 27/24; B01J 37/08; B01J 37/346; B01J 37/349; B01J 2219/00132; B01J 2219/01141; C23C 16/52; C23C 14/54
  USPC .............. 502/339; 427/446, 123, 125, 126.5, 427/126.6, 201, 251, 372.2, 374.2, 374.3, 427/379, 904, 906; 118/720, 620, 641
  See application file for complete search history.

(56) References Cited

U.S. PATENT DOCUMENTS

| | | | |
|---|---|---|---|
| 8,518,606 B2 | 8/2013 | Martin et al. | |
| 10,941,500 B1* | 3/2021 | Myrick | C25D 5/10 |
| 11,193,191 B2 | 12/2021 | Yao et al. | |
| 11,369,929 B2 | 6/2022 | Hu et al. | |
| 2012/0004098 A1* | 1/2012 | Xiao | B01J 37/0215 |
| | | | 502/185 |
| 2015/0364772 A1 | 12/2015 | Kongkanand | |
| 2018/0369771 A1 | 12/2018 | Hu et al. | |
| 2019/0161840 A1 | 5/2019 | Yao et al. | |
| 2021/0252486 A1* | 8/2021 | Liang | C23C 16/4417 |
| 2022/0074035 A1* | 3/2022 | Yao | C22F 1/14 |

FOREIGN PATENT DOCUMENTS

| | | | | |
|---|---|---|---|---|
| CN | 106914237 A | * | 7/2017 | ............. B01J 23/42 |
| CN | 108906113 A | | 11/2018 | |
| CN | 109433192 A | | 3/2019 | |
| CN | 109569720 A | | 4/2019 | |
| JP | 2001-162175 A | | 6/2001 | |
| JP | 2001-523568 A | | 11/2001 | |
| JP | 2010-005531 A | | 1/2010 | |
| WO | WO 2012/020268 A1 | | 2/2012 | |
| WO | WO 2017/135136 A1 | | 8/2017 | |
| WO | WO 2020/236767 A1 | | 11/2020 | |

OTHER PUBLICATIONS

Fei et al., "Microwave-Assisted Rapid Synthesis of Graphene-Supported Single Atomic Metals," *Advanced Materials*, 2018, 30:1802146. (8 pages).
Jones et al., "Thermally stable single-atom platinum-on-ceria catalysts via atom trapping," *Science*, 2016, 353(6295): pp. 150-154. (5 pages).
Li et al., "In Situ/Operando Techniques for Characterization of Single-Atom Catalysts," *ACS Catalysis*, 2019, 9: pp. 2521-2531. (11 pages).
Li et al., "Microenvironment modulation of single-atom catalysts and their roles in electrochemical energy conversion," *Science Advances*, 2020, 6(39): eabb6833. (19 pages).
Liu et al., "Atomically dispersed platinum supported on curved carbon supports for efficient electrocatalytic hydrogen evolution," *Nature Energy*, 2019, 4: pp. 512-518. (7 pages).
Liu et al., "Photochemical route for synthesizing atomically dispersed palladium catalysts," *Science*, 2016, 352(6287): pp. 797-801. (5 pages).
Liu et al., "Rare Earth Single-Atom Catalysts for Nitrogen and Carbon Dioxide Reduction," *ACS Nano*, 2020, 14: pp. 1093-1101. (9 pages).
Liu et al., "Strong metal-support interaction promoted scalable production of thermally stable single-atom catalysts," *Nature Communications*, 2020, 11:1263. (9 pages).
Marcinkowski et al., "Pt/Cu single-atom alloys as coke-resistant catalysts for efficient C—H activation," *Nature Chemistry*, 2018, 10: pp. 325-332. (8 pages).
Moliner et al., "Reversible Transformation of Pt Nanoparticles into Single Atoms inside High-Silica Chabazite Zeolite," *Journal of the American Chemical Society*, 2016, 138: pp. 15743-50. (8 pages).
Qiao et al., "Single-atom catalysis of CO oxidation using $Pt_1/FeO_x$," *Nature Chemistry*, 2011, 3: pp. 634-641. (8 pages).
Wei et al., "Direct observation of noble metal nanoparticles transforming to thermally stable single atoms," *Nature Nanotechnology*, 2018, 13: pp. 856-861. (8 pages).
Wei et al., "Iced photochemical reduction to synthesize atomically dispersed metals by suppressing nanocrystal growth," *Nature Communications*, 2017, 8: 1490. (8 pages).
Yang et al., "A universal ligand mediated method for large scale synthesis of transition metal single atom catalysts," *Nature Communications*, 2019, 10:4585. (9 pages).
Zhang et al., "Electrochemical deposition as a universal route for fabricating single-atom catalysts," *Nature Communications*, 2020, 11:1215. (8 pages).
Zhao et al., "Two-Step Carbothermal Welding to Access Atomically Dispersed $Pd_1$ on Three-Dimensional Zirconia Nanonet for Direct Indole Synthesis," *Journal of the American Chemical Society*, 2019, 141: pp. 10590-10594. (5 pages).
CN Office Action, issued Aug. 11, 2023 (Aug. 11, 2023), in Chinese Application No. 202080055909.0. (7 pages).
CN Office Action, issued Apr. 24, 2024 (Apr. 24, 2024), in Chinese Application No. 202080055909.0. (4 pages).
EP Office Action, issued Oct. 24, 2022 (Oct. 24, 2022), in European Application No. 20822636.5. (7 pages).
JP Office Action, issued Mar. 5, 2024 (Mar. 5, 2024), in Japanese Application No. 2021-574276. (21 pages).
Liu et al., "A computational study on Pt and Ru dimers supported on graphene for the hydrogen evolution reaction: new insight into the alkaline mechanism," *Journal of Materials Chemistry A*, Jan. 2019, 7: pp. 3648-3654. (7 pages).
International Search Report and Written Opinion, dated Sep. 9, 2020, in International Application No. PCT/US20/37668. (9 pages).
Cheng et al., "Platinum single-atom and cluster catalysis of the hydrogen evolution reaction," *Nature Communications*, Nov. 2016, 7: 13638. (10 pages).
Gao et al., "Graphdiyne-Supported Single-Atom-Sized Fe Catalysts for the Oxygen Reduction Reaction: DFT Predictions and Experimental Validations," *ACS Catalysis*, Oct. 2018, 8: pp. 10364-10374. (25 pages).
JP Office Action, issued Sep. 3, 2024 (Sep. 3, 2024), in Japanese Application No. 2021-574276. (19 pages).
Koike et al., "What is the Interaction between Atomically Dispersed Ni and Oxide Surfaces?," *Materials Transactions*, Feb. 2009, 50(3): pp. 509-515. (8 pages).
Ushiro et al., "X-ray absorption fine structure (XAFS) analyses of Ni species trapped in graphene sheet of carbon nanofibers," *Physical Review B*, Apr. 2006, 73: 144103. (12 pages).

* cited by examiner

SYSTEMS AND METHODS FOR HIGH TEMPERATURE SYNTHESIS OF SINGLE ATOM DISPERSIONS AND MULTI-ATOM DISPERSIONS

CROSS-REFERENCE TO RELATED APPLICATION

This application claims the benefit of, and priority to, U.S. Provisional Patent Application No. 62/861,639, filed on Jun. 14, 2019, which is hereby incorporated by reference herein in its entirety.

BACKGROUND

Technical Field

The present disclosure relates to synthesis of atomic dispersions, and more particularly, to high temperature synthesis of single atom dispersions or multi-atom dispersions.

Related Art

Single atom catalysts offer optimal atom-use efficiency and unique coordination environments and are of great interest for catalytic performance enhancements for many reactions, such as biomass conversion, oxidation, hydrogenation, and electro-catalysis, among others. However, the stability of single atom catalysts remains a challenge due to thermodynamically driven atom aggregation and corresponding performance degradation.

Various approaches have sought to improve the thermal stability of single atoms by enhancing the metal-substrate absorption, using kinetic or spatial confinement, or forming strong metal-substrate bonds. In general, atomic dispersions can be achieved by the confinement and coordination of metal atoms to the substrate in wet chemical synthesis to prevent atom aggregation. The successful synthesis of single atom catalysts at higher temperatures grants higher thermal stability, but high temperature synthesis is challenging to achieve and is incompatible with many temperature-sensitive methods and materials.

In addition, existing technologies are mostly limited to single element single atom catalysts, which do not realize potential synergistic interaction among different atoms that can outperform single atom catalysts and provide new functionalities derived from multi-elements interactions.

SUMMARY

The present disclosure relates to high temperature synthesis of single atom dispersions or multi-atom dispersions by heating pulses. Aspects of the present disclosure provide dispersed and stable single atoms and/or multi-atom groupings on substrates which have stable atom-substrate bonding.

In accordance with aspects of the present disclosure, a method of synthesizing atomic dispersions includes: positioning a loaded substrate, where the loaded substrate includes a substrate which is loaded with at least one of: a precursor of an element or a cluster of an element; applying one or more temperature pulses to the loaded substrate, where a pulse of the one or more temperature pulses applies a target temperature for a duration, where the target temperature is between 500 K and 4000 K, inclusive, and the duration is between 1 millisecond and 1 minute, inclusive; after the pulse, maintaining a cooling period; and after the one or more temperature pulses, providing single atoms of the element on the substrate.

In various embodiments of the method, the method includes, during the pulse, causing at least partial single atom dispersion of the element on the substrate and forming atom-substrate bonds to stabilize single atoms of the element on the substrate.

In various embodiments of the method, each of the one or more temperature pulses applies the target temperature for the duration, and the method includes, after each of the one or more temperature pulses, maintaining a cooling period.

In various embodiments of the method, the method includes, during each of the at least one temperature pulse, causing at least partial single atom dispersion of the element on the substrate and forming atom-substrate bonds to stabilize single atoms of the element on the substrate.

In various embodiments of the method, the method includes performing at least one iteration of: loading the substrate with at least one of: a precursor of a further element or a cluster of a further element; applying one or more further temperature pulses to the loaded substrate, where each of the one or more further temperature pulses applies the target temperature for the duration; after each of the one or more further temperature pulses, maintaining a cooling period; and after the one or more further temperature pulses, providing multi-atom dispersions of the element and the further element on the substrate.

In various embodiments of the method, the element and the further element are one of: a same element or different elements.

In various embodiments of the method, the element is one of Pt, Ru, or Co.

In various embodiments of the method, the substrate includes one or more of carbon-based materials, metals, ceramics, polymer, composites, or oxides.

In various embodiments of the method, the substrate includes one or more of carbon, $C_3N_4$, $TiO_2$, or $CO_2$-activated carbon nanofiber.

In accordance with aspects of the present disclosure, a system for synthesizing atomic dispersions includes: a loaded substrate including a substrate which is loaded with at least one of: a precursor of an element or a cluster of an element; one or more heating elements; and a controller configured to: control the one or more heating elements to apply one or more temperature pulses to the loaded substrate, where a pulse of the one or more temperature pulse applies a target temperature for a duration, where the target temperature is between 500 K and 4000 K, inclusive, and the duration is between 1 millisecond and 1 minute, inclusive, and after the pulse, maintain a cooling period. After the one or more temperature pulses, single atoms of the element are dispersed on the substrate.

In various embodiments of the system, the pulse causes at least partial single atom dispersion of the element on the substrate and causes formation of atom-substrate bonds to stabilize single atoms of the element on the substrate.

In various embodiments of the system, the one or more heating elements are configured to apply one of: direct Joule heating, conduction heating, radiative heating, microwave heating, laser heating, or plasma heating.

In various embodiments of the system, the controller is configured to: control the one or more heating elements to, for each of the one or more temperature pulses, apply the target temperature for the duration, and after each of the one or more temperature pulses, maintain a cooling period.

In various embodiments of the system, the system includes a conveyor holding the loaded substrate, where the controller is configured to control the conveyor to convey the loaded substrate for heating by the at least one heating element, and where controlling the one or more heating elements to apply the one or more temperature pulses to the loaded substrate includes: controlling the one or more heating elements to maintain the temperature, and controlling a speed of the conveyor to expose portions of the loaded substrate to each of the one or more heating elements for the duration.

In various embodiments of the system, the one or more heating elements include a plurality of heating elements, where the plurality of heating elements are positioned apart such that conveying the portions of the loaded substrate on the conveyor between each of the plurality of heating elements implements the cooling period.

In various embodiments of the system, the loaded substrate is a contiguous strip, and the conveyor continuously conveys the contiguous strip of loaded substrate.

In various embodiments of the system, the loaded substrate is in one of: powder form or droplet form, and the system includes a projection device for projecting the loaded substrate through the one or more heating elements, where controlling the at least one heating element to apply the at least one temperature pulse to the loaded substrate includes: controlling the at least one heating element to maintain the temperature, and controlling a projection speed of the projection device to expose the loaded substrate to each of the at least one heating element for the duration.

In various embodiments of the system, the at least one heating element includes a plurality of heating elements and the plurality of heating elements are positioned apart such that travel of the projected loaded substrate between each of the plurality of heating elements implements the cooling period.

In various embodiments of the system, the element is one of Pt, Ru, or Co.

In various embodiments of the system, the substrate includes at least one of carbon-based materials, metals, ceramics, polymer, composites, or oxides.

In various embodiments of the system, the substrate includes at least one of carbon, $C_3N_4$, $TiO_2$, or $CO_2$-activated carbon nanofiber.

In accordance with aspects of the present disclosure, a structure includes a substrate, dispersed single atoms of an element on the substrate, and bonding between the single atoms and the substrate.

In various embodiments of the structure, the bonding includes one or more of: metallic bonds, covalent bonds, ionic bonds, or Van der Waals forces.

In various embodiments of the structure, the element is one of Pt, Ru, or Co.

In various embodiments of the structure, the substrate includes at least one of carbon-based materials, metals, ceramics, polymer, composites, or oxides.

In various embodiments of the structure, the substrate includes at least one of carbon, $C_3N_4$, $TiO_2$, or $CO_2$-activated carbon nanofiber.

In various embodiments of the structure, the single atoms are catalysts for at least one of: biomass conversion, oxidation, hydrogenation, thermochemical catalysis, electrochemical catalysis, photochemical catalysis, or fundamental study of atomic manipulation.

In accordance with aspects of the present disclosure, a structure includes a substrate, dispersed multi-atom groupings on the substrate, and bonding between the multi-atom groupings and the substrate. Each of the multi-atom groupings include at least two atoms, where the at least two atoms are a same element or at least some of the at least two atoms are different elements. The multi-atom groupings are selected from the group consisting of: bi-atom groupings, tri-atom groupings, groupings of four atoms, or groupings of more than four atoms.

In various embodiments of the structure, the bonding includes one or more of: metallic bonds, covalent bonds, ionic bonds, or Van der Waals forces.

In various embodiments of the structure, the multi-atom groupings include Pt—Ru bi-atoms.

In various embodiments of the structure, the multi-atom groupings include Pt—Co bi-atoms.

In various embodiments of the structure, the substrate includes at least one of carbon nano-fibers, reduced graphene oxide, or $C_3N_4$.

In various embodiments of the structure, the multi-atom groupings are catalysts for at least one of: biomass conversion, oxidation, hydrogenation, thermochemical catalysis, electrochemical catalysis, photochemical catalysis, or fundamental study of atomic manipulation.

Further details and aspects of exemplary embodiments of the present disclosure are described in more detail below with reference to the appended figures.

BRIEF DESCRIPTION OF THE DRAWINGS

The above and other aspects and features of the present disclosure will become more apparent in view of the following detailed description when taken in conjunction with the accompanying drawings wherein like reference numerals identify similar or identical elements and.

DETAILED DESCRIPTION

The present disclosure relates to high temperature synthesis of single atom dispersions or multi-atom dispersions by heating pulses. Aspects of the present disclosure provide dispersed and stable single atoms and/or multi-atom groupings on substrates which have stable atom-substrate bonding. Temperatures expressed with the letter "K" will be understood to refer to Kelvins, and temperatures expressed with the letter "C" will be understood to refer to Celsius.

The synthesis process disclosed herein may be referred to as high-temperature heating pulse ("HTHP"). The HTHP process synthesizes and stabilizes single atoms at high temperatures and can be achieved using programmable, periodic on-off heating pulse(s) having a short on-state (e.g., ~1500 K for ≤55 milliseconds) and a longer off-state (e.g., 10-times longer than on-state, near room temperature). In various embodiments, the on-state provides activation energy for single atom dispersion by forming atom-substrate bonds that can naturally sustain high temperature annealing. The longer off-state achieves overall dispersion stability by preventing extended heating-induced atom aggregation, metal vaporization, and substrate deterioration. The on-off heating pulse(s) lead to atom dispersion while keeping the substrate stable during high temperature exposure.

As will be described later herein, the HTHP process can be applied to synthesize multi-atom groupings or atomic alloys, which are composed of the same or different elements where each element is a single atom and is bonded to each other and the substrate. As used herein, the term "multi-atom grouping" refers to and includes groupings of two or more atoms on a substrate resulting from sequential application of the HTHP process, such as groupings of two atoms, of three atoms, of four atoms, or other numbers of atoms. The atoms in a multi-atom grouping may be the same element or may be different elements. For example, all atoms in a multi-atom grouping may be the same element, or all atoms in a multi-atom grouping may be different elements, or some atoms in a multi-atom grouping may be different elements while some atoms in the grouping are the same element. Examples of multi-atom groupings will be described later herein in connection with FIGS. 5-7.

Portions of the present disclosure refer to U.S. Provisional Patent Application No. 62/861,639, filed on Jun. 14, 2019, which has been incorporated by reference in its entirety, and which may be referred to herein as "Supplement."

Figure 1:
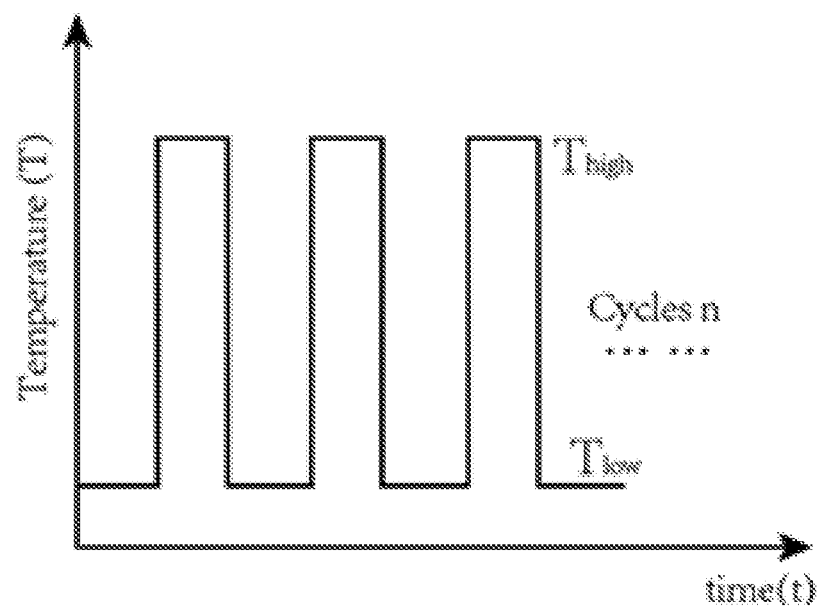
FIG. 1 is a diagram of exemplary control of high temperature heating pulses, in accordance with aspects of the present disclosure.

Referring now to FIG. 1, there is shown a diagram of exemplary control of high temperature heating pulses. The illustration of FIG. 1 is not intended to be drawn to scale. The heating pulses can be controlled to achieve a heating on-state target temperature of $T_{high}$. In various embodiments, the various pulses may not achieve exactly temperature $T_{high}$ and may have temperatures above or below $T_{high}$, and different pulses may achieve different temperatures. During the heating off-state, the process can be controlled to achieve an off-state target temperature of $T_{low}$. In various embodiments, the various off-states may not achieve exactly temperature $T_{low}$, and may have temperatures above or below $T_{low}$, and different off-state periods may achieve different temperatures. The temperature $T_{low}$ may be, for example, room temperature or ambient temperature.

Heating configurations for implementing the temperature pulse control of FIG. 1 are described later in connection with FIG. 3. For now, it is sufficient to note that the temperatures $T_{high}$ and $T_{low}$ may be sensed by one or more temperature sensors, which can sense temperature of a heating element or sense temperature of the environment near a material being heated, among other possibilities. In various embodiments, the temperatures $T_{high}$ and $T_{low}$ may be presumed based on predetermined heating characteristics of a heating element and a heating environment, such as where a temperature sensor is not be used at all or is not used at a desired location.

The control diagram of FIG. 1 is exemplary and variations are contemplated to be within the scope of the present disclosure. For example, although a number of n pulses are illustrated, the HTHP process may implement just a single pulse (n=1) in various scenarios. Additionally, the pulse control is programmable and different control patterns may be implemented. For example, in various embodiments, various pulses can have different target temperatures. Such variations are contemplated to be within the scope of the present disclosure.

Figure 2:
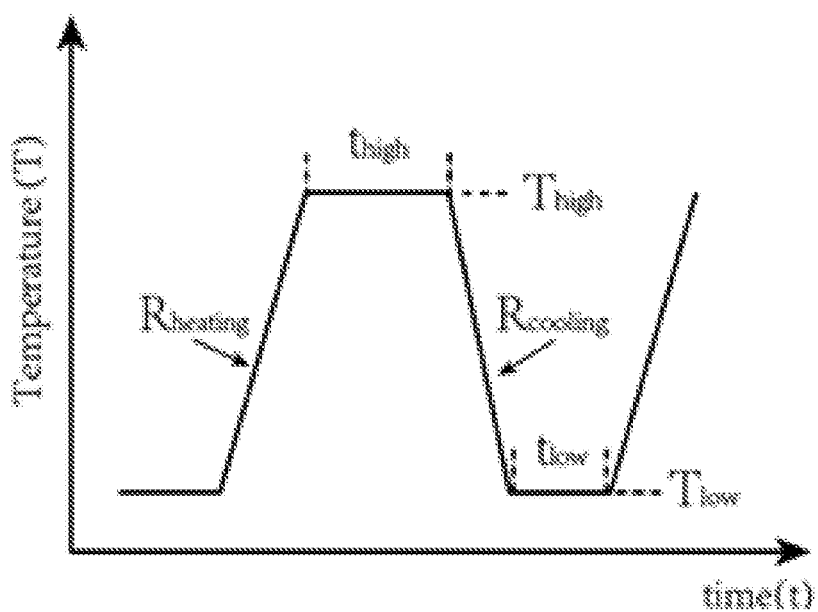
FIG. 2 is a diagram of an exemplary individual high temperature heating pulse, in accordance with aspects of the present disclosure.

FIG. 2 is a diagram of an exemplary individual high temperature heating pulse. The illustration of FIG. 2 is not intended to be drawn to scale. The heating pulse can controlled to ramp up at a heating rate $R_{heating}$, which may or may not be constant and can be, for example, between 10 K/minute and $10^7$ K/minute, inclusive. When the target temperature $T_{high}$ is achieved, the temperature can be controlled at the target temperature for a duration of $t_{high}$. In various embodiments, the target temperature $T_{high}$ can be between 500 K and 4000 K, inclusive, and the duration $t_{high}$ for maintaining the target temperature can be between 1 millisecond and 1 minute, inclusive. For example, for a target temperature $T_{high}$ between 1500 K and 2000 K, the duration $t_{high}$ for maintaining the target temperature can be approximately 55 milliseconds. As described above, the actual temperature achieved may not be exactly $T_{high}$ and may be above or below the target temperature.

After the temperature is controlled at the target temperature for the duration $t_{high}$, the temperature can be controlled to ramp down at a cooling rate $R_{cooling}$, which may or may not be constant and can be, for example, between −10 K/minute and $-10^7$ K/minute, inclusive. When the target temperature $T_{low}$ is achieved, the temperature can be controlled at the target temperature for a duration of $t_{low}$. In various embodiments, the target temperature $T_{low}$ can be room temperature or ambient temperature, and the duration $t_{low}$ for maintaining the target temperature can be approximately ten times the duration of $t_{high}$, such as between 10 milliseconds and 10 minutes, inclusive. In various embodiments, the duration $t_{low}$ may not be ten times the duration of $t_{high}$ and can be another time duration. For example, for a $t_{high}$ duration of about 55 milliseconds, the duration of $t_{low}$ can be about 550 milliseconds. As described above, the actual temperature achieved may not be exactly $T_{low}$ and may be above or below the target temperature.

The illustration of FIG. 2 is exemplary and variations are contemplated to be within the scope of the present disclosure. For example, although the heating rate $R_{heating}$ and the cooling rate $R_{cooling}$ are illustrated as constant rates, they may be variable rates that are controlled according to a programmed progression. Additionally, the heating rate $R_{heating}$ and the cooling rate $R_{cooling}$ may be very different from each other, such as when the cooling rate is achieved passively. In various embodiments, the cooling rate can be achieved by active cooling. Such and other variations are contemplated to be within the scope of the present disclosure.

Figure 3:
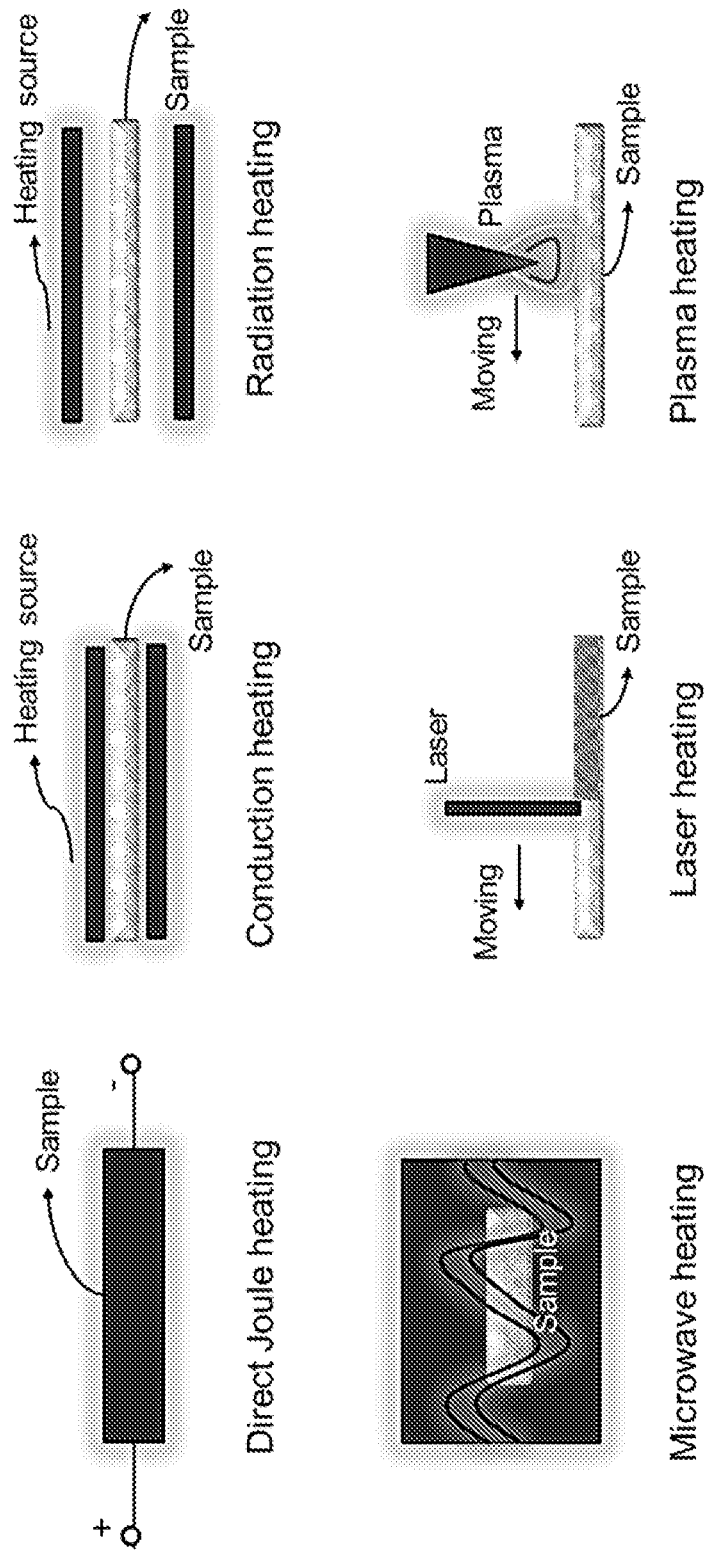
FIG. 3 is a diagram of exemplary heating configurations for applying high temperature heating pulses, in accordance with aspects of the present disclosure.

Referring now to FIG. 3, there is shown a diagram of exemplary heating configurations for applying high temperature heating pulses. In accordance with aspects of the present disclosure, any heating configuration can be used if the temperature pulses can be controlled in the manner described in connection with FIGS. 1 and 2. For example, FIG. 3 illustrates six possible configurations, including direct Joule heating, conduction heating, radiative heating, microwave heating, laser heating, and plasma heating. However, other heating configurations not illustrated or described herein can be used. The various configurations can be implemented with a cooling mechanism (not shown), such as, but not limited to, cooling by radiation and conduction, active cooling by conduction and convection, and/or active cooling by physical or chemical transitions that absorb heat, among other possibilities. Depending on which heating configuration is implemented, one or more temperature sensors (not shown) may be deployed at one or more locations, as described above. In various embodiments, the temperatures may be presumed based on predetermined heating characteristics of a heating element and a heating environment, such as where a temperature sensor is not be used at all or is not used at a desired location.

The heating configurations can include a controller (not shown) that is implemented or programmed to control the heating pulses in the manner described in connection with FIGS. 1 and 2. A controller can include, for example, one or more of a central processing unit, a microcontroller, a digital signal processor, a field programmable gate array (FPGA), a programmable logic device (PLD), and/or an application specific integrated circuit (ASIC), among other types of processors and circuits. The heating configurations may also include other components, such as, without limitation, a power source, a fuel source, motors, housings, insulation, and/or other sensors, among other components. Such components are not shown to provide clearer illustrations, but they will be understood and recognized by persons skilled in the art.

Figure 4:
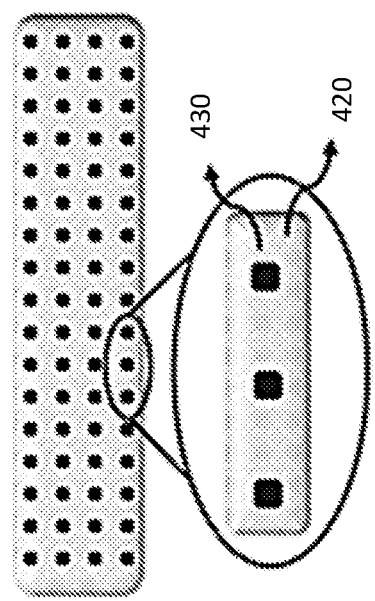
FIG. 4 is a diagram of an exemplary process of synthesizing single atom dispersions using high temperature heating pulses, in accordance with aspects of the present disclosure.
Figure 4:
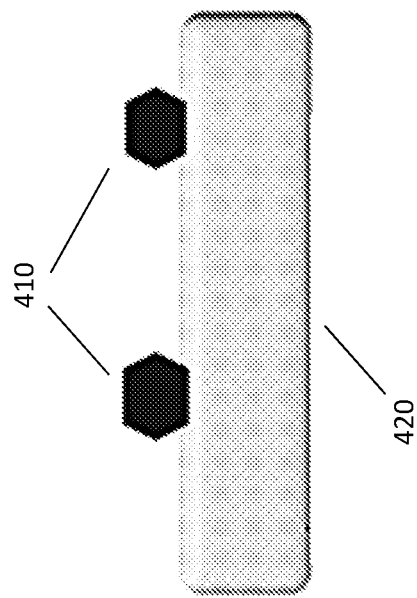

FIG. 4 is a diagram of an exemplary process of synthesizing single atom dispersions using high temperature heating pulses. Precursors or atomic clusters of an element 410 are loaded on a substrate 420, and the HTHP process is applied to the loaded substrate. The loaded substrate 410/420 can be processed in, for example, a heating configuration shown in FIG. 3. The HTHP process converts precursors 410 to the desired atoms 430 and/or disperses atomic clusters 410. The high temperature on-state of the HTHP process promotes single atom 430 dispersion and stabilization by strong atom-substrate bonds, while the off-state achieves overall stability by preventing overheating-induced atom aggregation and substrate deterioration. The on-off heating pulse(s) result in atom dispersion 430 on the substrate 420 while keeping the substrate 420 stable during high temperature exposure. The single atom dispersion effectuated by the HTHP process may not disperse every cluster and some clusters may remain after the HTHP process.

In various embodiments, the single atoms 430 can be any single atom, including, without limitation, Pt, Ru, or Co. In various embodiments, the substrate 420 can be carbon-based materials, metals, ceramics, polymer, composites, oxides, and/or their combinations. For example, the substrate 420 can be carbon, $C_3N_4$, or $TiO_2$ substrates, or $CO_2$-activated carbon nanofiber (CA-CNF) substrates. As used herein, the term "defect" is a feature of a substrate and refers to and includes irregularity in a substrate structure and/or departure/deviation from regular structure of a substrate. As described above, defects in a substrate operate to stabilize single atoms on the substrate. The illustration of FIG. 4 is exemplary and is not intended to be drawn to scale. For example, the single atoms 430 may not be evenly or regularly spaced on the substrate 420. In various embodiments, the single atoms 430 may have uneven or irregular spacing. Additionally, not every atom of the element on the substrate 420 will be a single atom and portions of the substrate 420 may include groupings of multiple atoms of the element.

Figure 5:
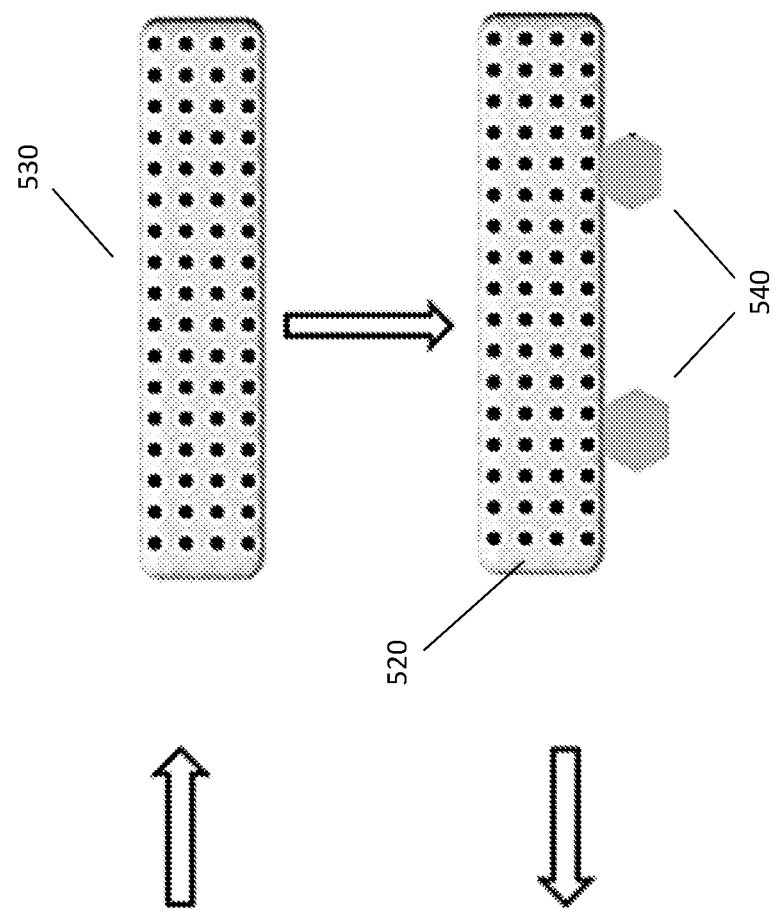
FIG. 5 is a diagram of an exemplary process of synthesizing multi-atom groupings using high temperature heating pulses, in accordance with aspects of the present disclosure.
Figure 5:
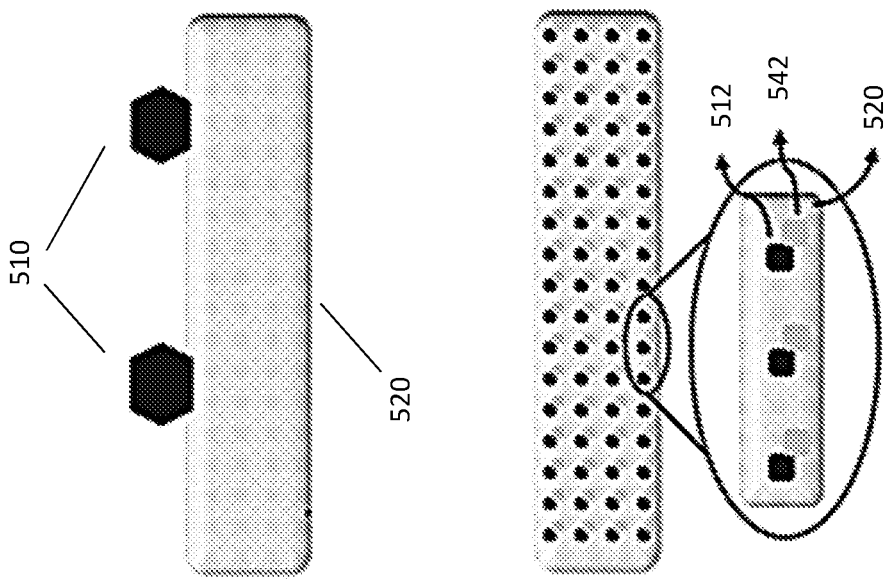

FIG. 5 is a diagram of an exemplary process of synthesizing multi-atom groupings using high temperature heating pulses. Precursors or clusters of an element A 510 are loaded on a substrate 520, and the HTHP process is applied to the loaded substrate to provide single atom dispersion and stabilization 530. Next, precursors or clusters of an element B 540 are further loaded on the substrate 520, and the HTHP process is applied to the further loaded substrate to provide single atom dispersion and stabilization of atom B 542. By this process, the atoms B 542 can be dispersed and stabilized on the substrate 520 at the same locations as the atoms A 512, thereby forming multi-atom groupings, and/or can be dispersed and stabilized on the substrate 520 at different locations from atoms A 512. In various embodiments, atom A and atom B may be the same element, or atom A and atom B may be different elements.

The illustration of FIG. 5 is exemplary and is not intended to be drawn to scale. For example, the single atoms and multi-atom groupings may not be evenly or regularly spaced on the substrate. In various embodiments, the single atoms or multi-atom groupings may have uneven or irregular spacing. In various embodiments, not every atom A 512 may be grouped with an atom B 542, and not every atom B 542 may be grouped with an atom A 512. Additionally, certain groups on the substrate 520 may include groupings of multiple atoms A 512 or multiple atoms B 542. In other words, the single atom dispersion effectuated by the HTHP process may not disperse every cluster and some clusters may remain after the HTHP process. In various embodiments, the single atoms 512, 542 can be any single atom, including, without limitation, Pt, Ru, and/or Co. In various embodiments, the substrate 520 can be carbon-based materials, metals, ceramics, polymer, composites, oxides, and/or their combinations. For example, the substrate 520 can be carbon, $C_3N_4$, or $TiO_2$ substrates, or $CO_2$-activated carbon nanofiber (CA-CNF) substrates.

Figure 6:
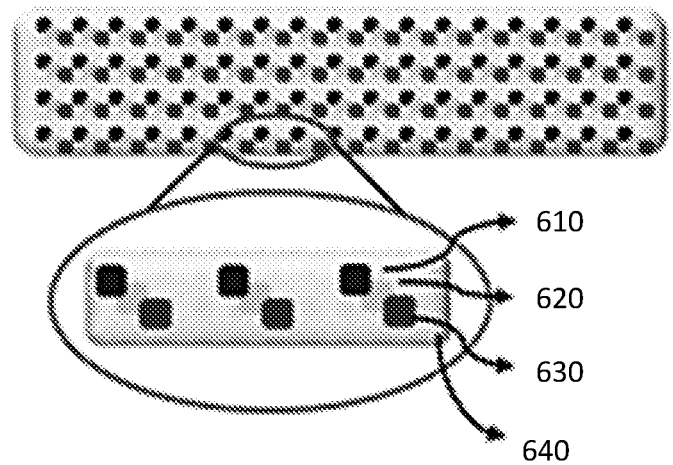
FIG. 6 is a diagram of an exemplary result having 3-atom groupings, in accordance with aspects of the present disclosure.
Figure 7:
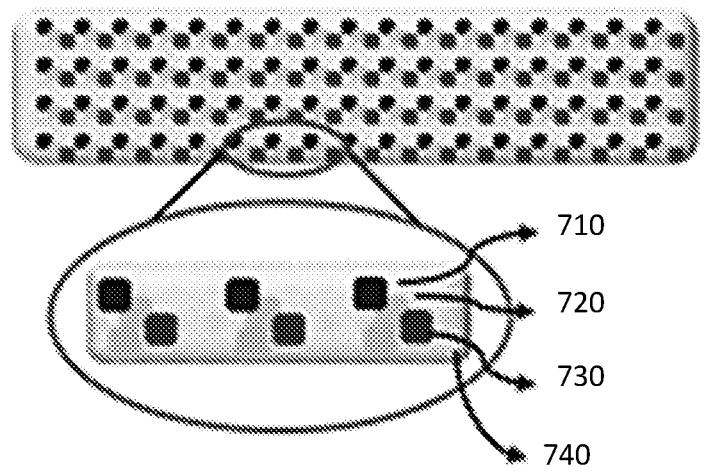
FIG. 7 is a diagram of an exemplary result having multi-atom groupings, in accordance with aspects of the present disclosure.

The process of further loading a substrate with another precursor or cluster of an element may be repeated to form larger groupings of multiple atoms. For example, FIG. 6 is a diagram of an exemplary result having 3-atom groupings formed by an atom A 610, an atom B 620, and an atom C 630 on a substrate 640, and FIG. 7 is a diagram of an exemplary result having multi-atom groupings of a number n of atoms formed by an atom A 710, an atom B 720, through an atom n 730 on a substrate 740. The results of FIGS. 6 and 7 can be achieved by sequentially/iteratively loading a substrate and applying the HTHP process to the loaded substrate. The atoms in each grouping can be the same element or can include different elements. In various embodiments, the single atoms can be any single atom, including, without limitation, Pt, Ru, or Co. The substrate can be carbon-based materials, metals, ceramics, polymer, composites, oxides, and/or their combinations. For example, the substrate can be carbon, $C_3N_4$, or $TiO_2$ substrates, or $CO_2$-activated carbon nanofiber (CA-CNF) substrates.

The resulting substrates having single atom dispersions and/or multi-atom dispersions can be used for various applications, such as, without limitation, biomass conversion, oxidation, hydrogenation, thermochemical catalysis, electrochemical catalysis, photochemical catalysis, and/or fundamental study of atomic manipulation, among others.

Accordingly, described above are examples of systems and methods for implementing high temperature heating pulses. The following describes examples of particular systems or examples of particular materials and substrates processed by high temperature heating pulses.

Figure 8:
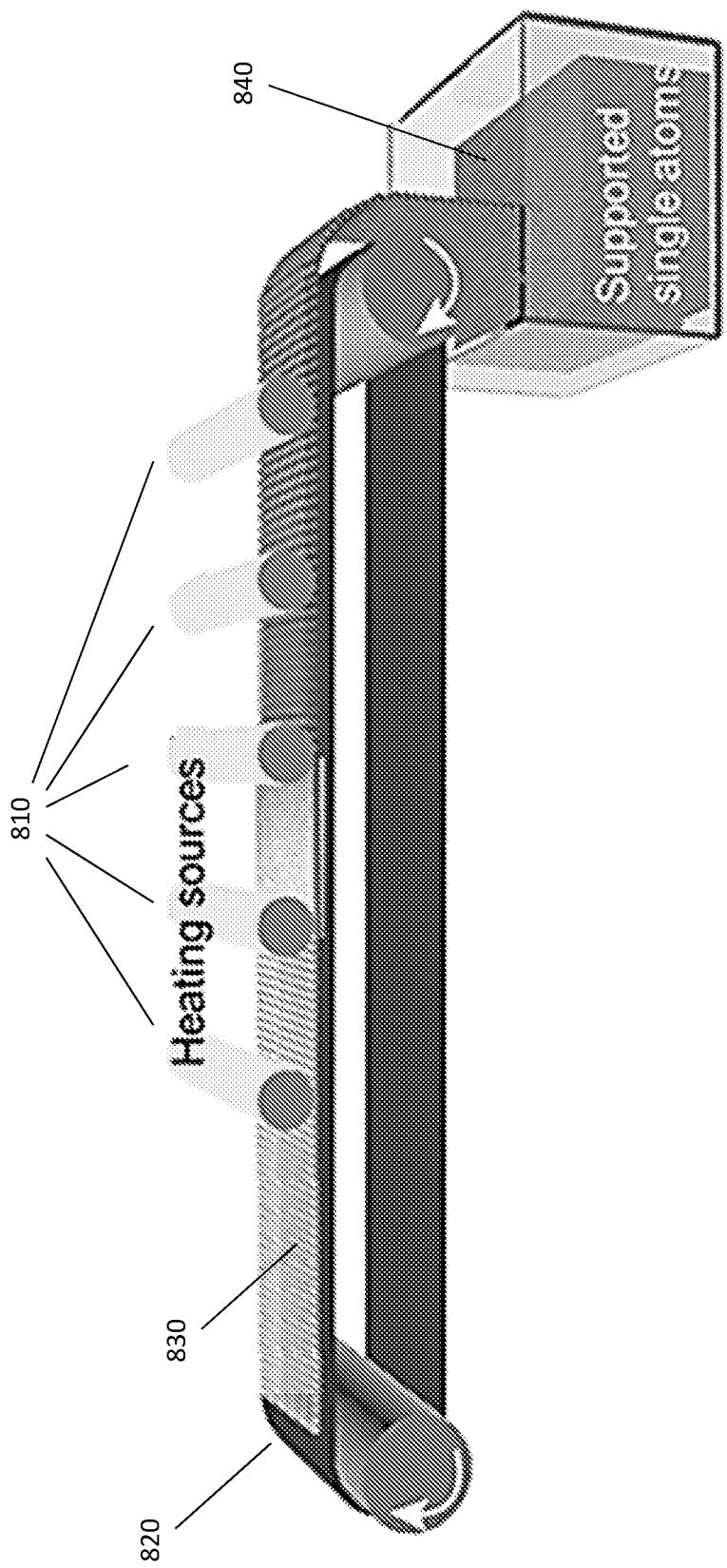
FIG. 8 is a diagram of an exemplary heating configuration having multiple heating elements and a conveyor, in accordance with aspects of the present disclosure.

FIG. 8 shows a diagram of an exemplary heating configuration having multiple heating sources/elements 810 and a conveyor 820 that conveys one or more loaded substrates 830 to be heated by the heating elements 810. The heating elements 810 may remain heated and their temperature may not need to be ramped up or down. Rather, the speed of the conveyor 820 can be configured to expose the loaded substrate(s) 830 to an individual heating element 810 for a duration $t_{high}$ corresponding to the on-state of FIG. 2. The positions of the heating elements 810 can be configured such that the travel time of the substrate(s) 830 between heating elements 810 is the duration $t_{low}$ corresponding to the off-state of FIG. 2. When the illustrated configuration is used with a contiguous strip of substrate 830 loaded with precursors or clusters of an element, the HTHP process can be applied continuously to synthesize single atom or multi-atom dispersions 840 at a high synthesis rate.

Figure 14:
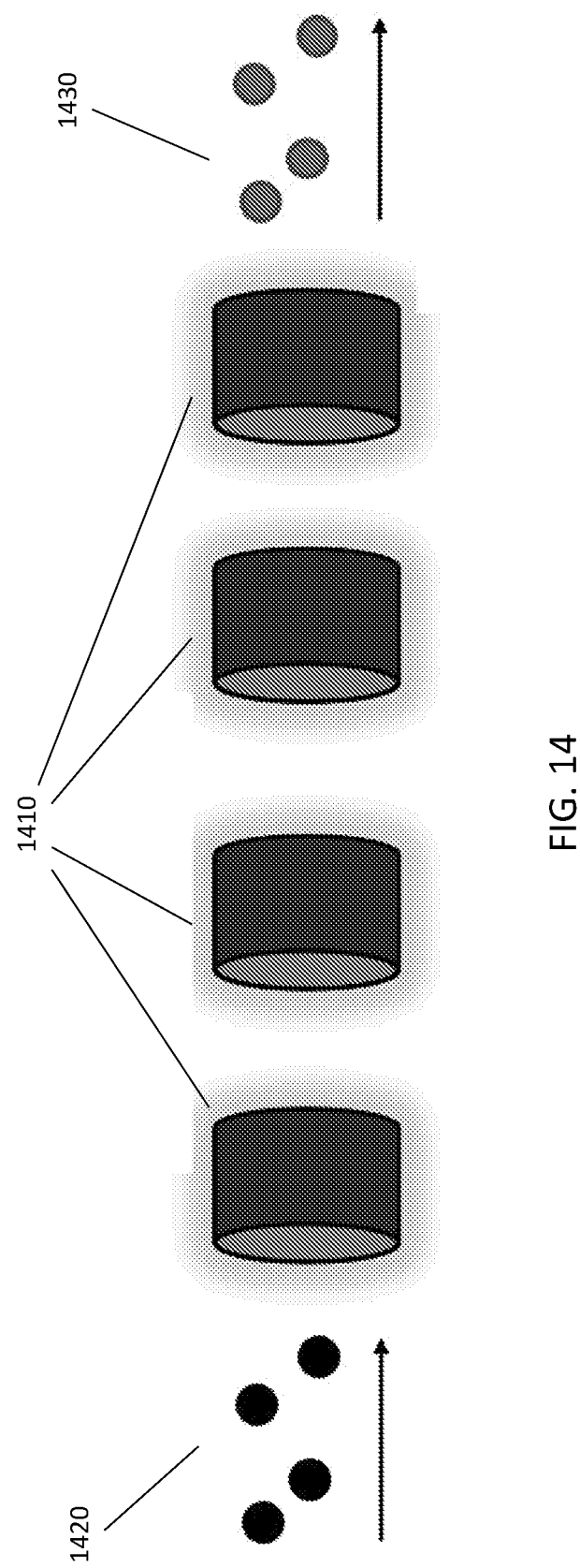
FIG. 14 is a diagram of an exemplary heating configuration for applying the HTHP process to microsized powder or droplet substrate particles, in accordance with aspects of the present disclosure.

Referring to FIG. 14, there is shown a diagram of an exemplary heating configuration for applying the HTHP process to microsized powder or droplet substrate particles, in accordance with aspects of the present disclosure. The illustrated heating configuration includes multiple heating elements 1410 through which microsized powder or droplet substrate particles 1420 (e.g., aerosolized) may be projected by a projection device (not shown), such as by a sprayer or blower. In various embodiments, the microsized powder or droplet substrate particles 1420 can have substrates having carbon-based materials, metals, ceramics, polymer, composites, oxides, and/or their combinations. The microsized powder or droplet substrate particles 1420 can be loaded with precursors of an element or clusters of an element. The heating elements 1410 may remain heated and their temperature may not need to be ramped up or down. Rather, the speed at which the microsized powder or droplet particles 1420 are projected can be configured to expose the loaded powder or droplet substrate particles 1420 to an individual heating element 1410 for a duration $t_{high}$ corresponding to the on-state of FIG. 2. The positions of the heating elements 1410 can be configured such that the travel time of the substrate(s) 1420 between heating elements 1410 is the duration $t_{low}$ corresponding to the off-state of FIG. 2. When the illustrated configuration is used with a continuous stream of microsized powder or droplet substrate particles loaded with precursors or clusters of an element 1420, the HTHP process can be applied continuously to synthesize single atom or multi-atom dispersions on microsized substrate particles 1430 at a high synthesis rate.

The following will now describe applying the HTHP process to particular atoms and substrates. In the following description, any of the heating configurations can be used, such as any of the heating configurations of FIG. 3, FIG. 8, or FIG. 14.

Figure 9:
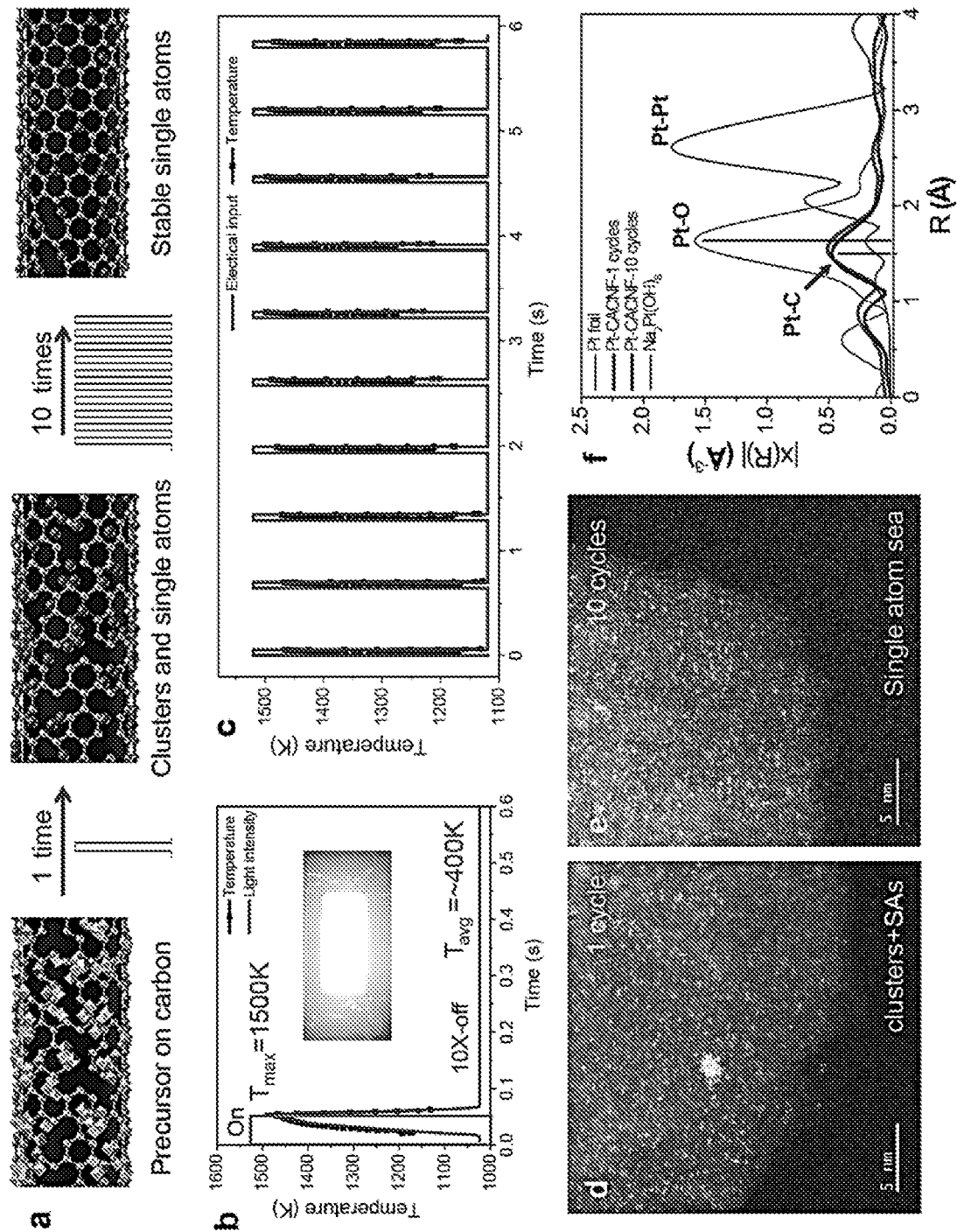
FIG. 9 shows graphs and images relating to applying a high-temperature heating pulse (HTHP) process to synthesize Pt atoms on $CO_2$-activated carbon nanofiber (CA-CNF) substrates, in accordance with aspects of the present disclosure.

FIG. 9 shows graphs and images relating to applying the HTHP process to synthesize Pt atoms on $CO_2$-activated carbon nanofiber (CA-CNF) substrates. In FIG. 9, portion (a) is a schematic diagram showing the HTHP synthesis and dispersion process involving carbon atoms, metal precursor, and metallic atoms. Portion (b) shows the temperature evolution during the HTHP synthesis and the detailed heating/cooling pattern. The inset shows the light emitted from the material at high temperature. Portion (c) shows a 10-pulse heating pattern, illustrating the uniform temperature in each cycle with a high temperature on-state and a low temperature off-state. Portions (d) and (e) show high angle annular dark field (HAADF) images of Pt single atoms after 1 and 10 cycles of the HTHP process (0.01 µmol/cm$^2$). Portion (f) shows extended X-ray absorption fine structure (EXAFS) profiles (without phase correction) for Pt single atoms on CA-CNFs after 1 and 10 cycles of the HTHP process.

As schematically shown in FIG. 9, portion (a), ethanol-based salt precursors ($H_2PtCl_6$) are loaded onto the defective CA-CNFs (e.g., loading 0.01 µmol/cm$^2$, normalized to the geometric area) with good wetting. The precursor-loaded CA-CNF film is then subjected to the HTHP process using an electrical Joule heating process that can be programmed in terms of temperature, on-off durations, and repeated cycles (Supplement, FIG. S1). Thermal images captured by a high-speed camera show a uniform spatial temperature distribution during the shock heating process (Supplement, FIG. S2). FIG. 9, portion (b), shows the temperature evolution of a pulse heated to ~1500 K for 55 milliseconds and then rapidly quenched by directly cutting off the input current for 10 times longer, leading to an average temperature of ~400 K for the overall process. FIG. 9, portion (c), shows the temperature profile with 10 heating cycles over a 6 second period, demonstrating the relatively stable temperature that can be repeatedly achieved during the heating process. In addition, a temperature up to ~3000 K can be achieved (Supplement, FIG. S2c), allowing synthesis of thermally stable single atoms at high temperatures.

FIG. 9, portions (d) and (e), show high angle annular dark field (HAADF) images of Pt dispersed on the CA-CNF substrate after 1 and 10 heat pulses at 1500 K. For the single heat pulse, the surface of the CA-CNFs was dispersed with a high-density of single atoms, though Pt clusters are also visible (FIG. 9, portion (d), and Supplement, FIG. S3a). However, after 10 pulses, the substrate displayed a relatively uniform single atom distribution (FIG. 9, portion (d), and Supplement, FIG. S3b), indicating the further disassembly of clusters into single atoms during the continuous HTHP process. The single atom dispersion is confirmed by macroscopic extended X-ray absorption fine structure (EXAFS) (FIG. 9, portion (f)) and X-ray near edge structure (XANES) analysis (Supplement, FIG. S3c). The EXAFS spectrum of the 1-cycle sample shows a weak peak at ~2.5 Å corresponding to the Pt—Pt bonding, while a dominant peak at ~1.5 Å indicates the Pt-substrate bonds (Pt—C bond, as discussed later), revealing a structure of Pt nanoclusters mixed with single atoms. After 10 cycles, nearly no Pt—Pt bonds remain, indicating the dominance of single atom dispersion by disassembling the remaining clusters. The CA-CNF substrate has a surface area of ~56 m$^2$/g and the Pt loading is measured to be ~0.24 wt %. By varying the metal loading, nanoclusters can form at a higher loading (see Supplement, FIG. S4 for the cases of 0.05 and 0.1 μmol/cm²) due to limited stabilization sites.

To characterize the dispersion mechanism, control samples using different heating strategies (Supplement, FIG. S5a-c) are examined. Low temperature synthesis can lack the activation energy to effectively disperse and bond these atoms to the substrate (i.e., poor dispersion and stability), while high temperature annealing can lead to an unacceptable particle agglomeration due to overheating induced graphitization of the carbon substrate (i.e., losing of defects) and long-range atom diffusion. The HTHP process utilizes high temperature for single atom synthesis but each pulse is short enough to avoid the deterioration to the substrates, thereby maintaining the stability of the single atom dispersion.

As mentioned above, substrate defects help to bind mobile single atoms onto the substrate and improve their structural stability. (See Supplement, FIG. S5d-f). Applying the HTHP process on relatively crystalline CNF (without $CO_2$ activation) yields nanoclusters mixed with single atoms due to limited defective sites. In contrast, after activation, the improved defect concentration and presence of micropores (i.e., carbon vacancies) on CA-CNFs (Supplement, FIG. S6-S7) lead to a high-density single atom dispersion. Accordingly, a more defective substrate can accommodate high density single atoms. Therefore, this illustrates the roles of high temperature heating pulses and defects on the substrate for effective single atom dispersion and stabilization.

Single atoms synthesized by the HTHP process possess structural stability, especially when synthesized at a high temperature of 1500 K, which can be confirmed by in situ scanning transmission electron microscopy (STEM) from room temperature up to 1273 K. A sample can be stabilized for at least 30 minutes before taking images. As shown in Supplement, FIG. 2a, the Pt single atoms display a uniform and high-density single atom dispersion at each temperature up to 1273 K after holding for 60 minutes. In addition, the stability of the Pt single atoms can be confirmed by performing ex situ thermal annealing at 1073 K for 1 hour in a furnace with Ar flow (Supplement, FIG. S8). As the HTHP process can utilizes temperatures through 3000 K (Supplement, FIG. S2c), the HTHP process can enable synthesis of single atoms at an even higher temperatures. As an example, the HTHP process can be applied to synthesize single atoms at 1800 K and 2000 K (using a lesser loading of 0.005 μmol/cm²), and stable single atom dispersion can be seen by both STEM and EXAFS measurement (Supplement, FIG. 2c and FIG. S9).

For comparison, in Supplement, FIG. 2d, reports of single atoms synthesized using various methods are shown. Most wet chemical approaches use a mild temperature and the resulting single atoms are vulnerable under subsequent high temperature annealing, especially when there is no proper bonding or coordination with the substrate. Furnace heating or annealing at 1073-1173 K can substantially increase the thermal stability of single atoms by creating strong and stable metal-substrate bonding through atom trapping and substrate anchoring. However, the much higher temperature of the HTHP process surpasses furnace heating with the ability to synthesize single atoms through 1500-2000 K. In addition, a higher temperature synthesis provides ultrafast kinetics for single atom dispersion with much shorter processing durations (e.g., <10 seconds) and higher efficiency compared to low temperature methods.

Figure 10:
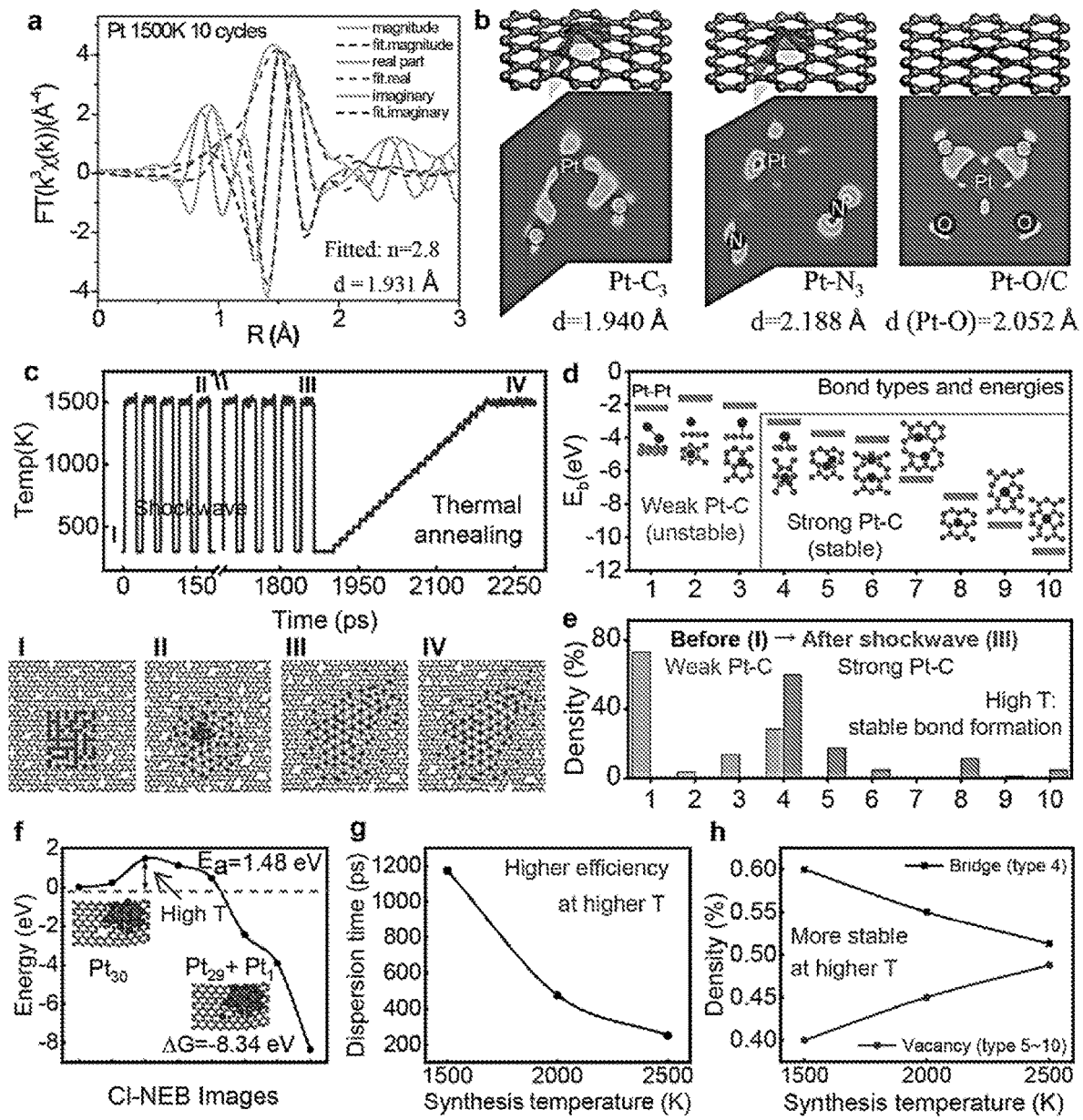
FIG. 10 shows diagrams and graphs relating to single atom bond structure, in accordance with aspects of the present disclosure.

With regard to single atom bond structure, the thermal stability resulting from the HTHP process comes from the ability of the Pt-substrate bond to resist high temperature annealing. FIG. 10 shows diagrams and graphs relating to single atom bond structure. Portion (a) shows first-shell model EXAFS fitting of the Fourier transform at Pt $L_3$-edge for a Pt-1500K-10 cycle sample, showing a bond distance of 1.931 Å with a coordination number of 2.8. Portion (b) shows density functional theory (DFT) calculated bond distances in the Pt—$C_3$, Pt—$N_3$, and Pt—$O_2C_2$ configurations. Portion (c) shows molecular dynamic (MD) simulation on the single atom dispersion (I-III) and subsequent annealing (IV) at 1500 K. Portion (d) shows identified Pt—Pt (type 1) and Pt—C bonds (type 2-10) in the dispersion system. Portion (e) shows the statistic distribution of bond configurations before (I) and after shockwave synthesis (III): the weak bonds become strong Pt—C bonds. Portion (f) shows energy analysis of a Pt atom deviated from a Pt-30 cluster by forming a thermodynamically stable Pt—C bond (type 10). Portion (g) shows time needed for single atom dispersion, and portion (h) shows associated bond configuration at different synthesis temperatures. The high temperature provides the activation energy for the bond formation, showing a higher dispersion efficiency with more stable Pt—C bonds (type 5-10) at higher synthesis temperatures.

With continuing reference to FIG. 10, the bond structure can be analyzed by extracting the nearest-neighbor coordination numbers and the local structure of the Pt single atoms from fitting the EXAFS profiles with first-shell model (Supplement, Table 1 and FIG. S10). FIG. 10, portion (a), shows an EXAFS fitting of Pt 1500K single atoms, rendering a bond distance of 1.931 Å and a coordination number of 2.8 (indicating a Pt—$X_3$ bond configuration). The bond length is considerably shorter than the literature reported Pt—O (2.01-2.05 Å) and Pt—N bonds (~2.3 Å), but is in good agreement with a Pt—C bond having a calculated bond length of 1.93 Å. Moreover, based on this Pt—$X_3$ bond model, the bond distance of Pt—C in Pt—$C_3$, Pt—N in Pt—$N_3$ and Pt—O in Pt—$O_2C_2$ can be calculated using density functional theory (DFT). The calculated Pt—C bond in Pt—$C_3$ configuration shows a bond distance of 1.940 Å, which is very close to the fitted result, while Pt—N and Pt—O bonds all have much larger bond distances (FIG. 10, portion (b)), confirming the Pt—C bond structure in the samples.

The DFT result also reveals that the bonding energy of Pt—C bonds is higher than Pt—N bonds under the similar bond configurations (Pt—$X_3$ and Pt—$X_4$) (Supplement, FIG. S11a). In addition, the charge density difference diagrams further illustrate the difference between Pt—C and Pt—N bonds: in Pt—C bonds, large amount of charge transfer appears between Pt and C atoms and the charge density is mainly concentrated in the center, indicating strong covalent bond nature; while in Pt—N bonds, the transferred electron is mainly circulated around the Pt and N atoms, which denotes an ionic bond (Supplement, FIG. S11b). Therefore, the Pt—C bonds demonstrate a higher binding energy and a unique covalent nature compared with Pt—N bonds in a similar bond configuration.

To understand the atomistic origin of the high temperature induced dispersion and stabilization, molecular dynamic (MD) simulations using the reactive force field (ReaxFF) potential can be performed. (See Supplement, SI Methods section). The defects on graphene contain randomly etched carbon vacancies to mimic the surface of CA-CNFs. FIG. 10, portion (c), depicts the dispersion of Pt clusters into single atoms with increasing heating cycles at 1500 K (from I to III), as well as the dispersion stability upon thermal annealing at 1500 K (IV). Both the agglomeration and atomization of Pt atoms can be seen, while the atomization can only be stabilized when energy-favorable Pt—C bonds are formed (type 4-10 in FIG. 10, portion (d)). FIG. 10, portion (e), shows the evolution of bond structures before and after the HTHP process at 1500 K, where all the initial weak bonds (Pt—Pt and type 1-3 Pt—C) change into strong Pt—C bonds (type 4-10) with higher binding energies, illustrating the atomic origin of why the single atoms synthesized by the HTHP process are more thermally stable than Pt clusters. The simulation clearly reproduced the synthesis process where the initial Pt clusters are weakly attached with the substrate, but with more HTHP heating, the clusters are disassembled into single atoms by forming strong Pt—C bonds that can sustain high temperature annealing. This also indicates that defects operate to stabilize single atoms and determine the dispersion density.

In the process, high temperature operates to provide sufficient activation energy for atom diffusion and overcome the energy barrier for bond formation. As an example, when a single Pt atom deviated from a Pt-30 cluster to form a Pt—C bond, kinetically there is an energy barrier (e.g., 1.48 eV) hindering the dispersion, which can be overcome at a high temperature (FIG. 10, portion (f), and Supplement, FIG. S12). The HTHP dispersion at other temperatures can also be simulated: 500 K, 1000 K, 2000 K, and 2500 K (Supplement, FIG. S13). Although similar HTHP heating pulse patterns (on/off ratio and cycle numbers) were applied, temperatures 500 K and 1000 K fail to fully disperse the Pt cluster within the given repeated cycles. In contrast, higher HTHP heating pulse temperatures have improved kinetics and achieve single atom dispersion much faster, i.e., a much higher dispersion efficiency (FIG. 10, portion (g)). Moreover, the Pt—C bond distribution in these single atoms shows increasing proportion of more stable type 5-10 bonds at higher synthesis temperatures, indicating improved thermal stability (FIG. 10, portion (h)). Therefore, high temperature synthesis for single atom dispersion and stabilization provides the activation energy, accelerates the dispersion process, and promotes more stable bond formation. For clarity, it is noted that the single atom dispersion effectuated by the HTHP process may not disperse every cluster and some clusters may remain after the HTHP process.

The paragraphs above describe application of HTHP process to synthesize Pu atoms. The HTHP synthesis process can be generally applied to other metals and substrates, in which high temperature enables atom dispersion by forming stable metal-defect bonds while the HTHP pulse heating helps maintain the overall stability. Since the HTHP temperature is sufficiently high compared with the thermal decomposition temperatures of most metal precursors, the HTHP process can be used to produce single atom dispersions of most metals, including Ru and Co single atoms on CA-CNFs, which is addressed in FIG. 11 and in Supplement, FIG. S14.

Figure 11:
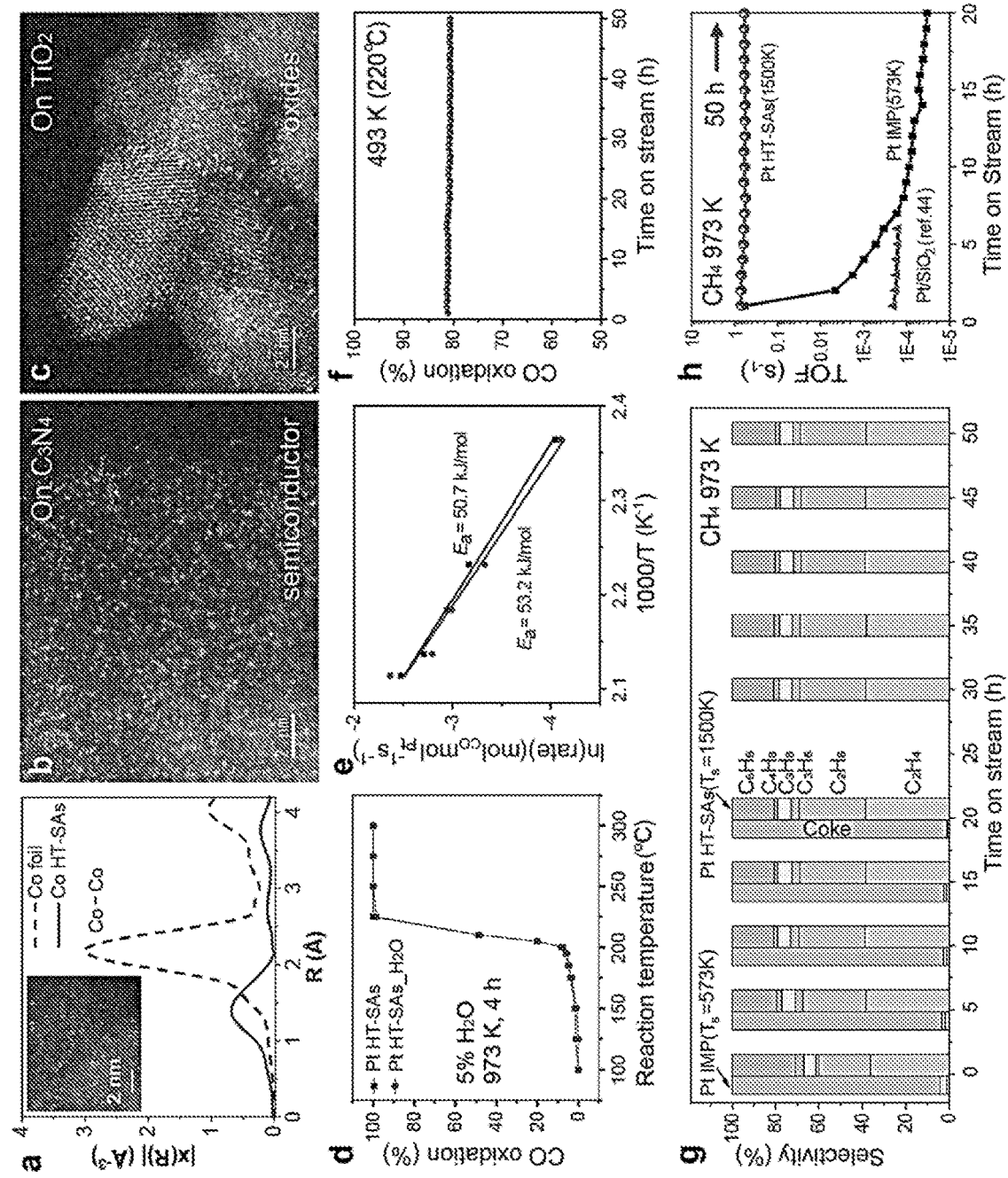
FIG. 11 shows graphs and images relating to applying a HTHP process to various atoms and substrates and for various applications, in accordance with aspects of the present disclosure.

FIG. 11 shows graphs and images relating to applying the HTHP process to various atoms and substrates and for various applications. Portion (a) shows Co single atoms synthesized on CA-CNFs confirmed by the EXAFS profile and a HAADF image (inset). Portions (b) and (c) show Pt single atoms synthesized on $C_3N_4$ and $TiO_2$ substrates through radiative and conductive shockwave synthesis (~0.5 wt %). Portion (d) shows the light-off curves, and portion (e) shows the Arrhenius plots of the Pt single atoms for the CO oxidation reaction before and after steam treatment at 973 K for 4 hours, showing a stable performance after hydrothermal treatment. Portion (f) shows the stable performance of the Pt single atoms during CO oxidation at 493 K for 50 hours. Portion (g) shows high temperature direct $CH_4$ conversion by Pt single atoms and Pt IMP samples at 973 K for 50 hours. Portion (h) shows the reaction turnover frequency (TOF) compared with the literature.

Additionally, with continuing reference to FIG. 11, the shockwave method can be extended to other substrates, such as conductive reduced graphene oxide, semiconductor $C_3N_4$ and oxides like $TiO_2$, but using a different heating method (Supplement, FIG. S15) and forming different bonds with the substrates (Supplement, FIG. S16). Radiative HTHP heating can be used for powder samples by depositing precursor-loaded powders beneath a carbon film that can be joule heated in a HTHP pulse pattern. The high temperature achieved in the film also heats the $C_3N_4$ powder and induces a high-density single atom dispersion (FIG. 11, portion (b)). In addition, the HTHP pulse heating maintains the structural integrity of $C_3N_4$ which otherwise would be easily carbonized by prolonged heating (Supplement, FIG. S17). The non-contact radiative heating can also be scaled up for continuous production (FIG. 8, and Supplement, FIG. S18). As oxides have poor thermal conductivity for effectively radiative heating, alternatively, Pt single atoms on $TiO_2$ substrates can be achieved by depositing a thin layer (~2.5 nm) of $TiO_2$ on the nanofibers in CA-CNF film via atomic layer deposition (Supplement, FIG. S15c). The HTHP pulse heating of the CA-CNF film also heats the $TiO_2$ layer through conductive heating and induces single atom dispersion on $TiO_2$ (FIG. 11, portion (c)). These results demonstrate the general applicability of the HTHP process for synthesizing thermally stable single atom dispersions, which suggests great potential for scalable nanomanufacturing.

To test the stability of the HTHP synthesized single atoms, an in situ hydrothermal test can be performed for Pt single atoms on CA-CNFs in an environmental TEM (ETEM) at a partial $H_2O$ pressure of $10^{-3}$ mbar from 300 K to 773 K (upper limit to avoid equipment corrosion), with each studied temperature held for at least 30 minutes. As shown in Supplement, FIG. S19, there is no nanocluster emerging during the in-situ measurement up to 773 K, demonstrating that the HTHP synthesized single atoms are stable. Further, the performance stability of the Pt HT-SAs in the CO oxidation reaction before and after hydrothermal treatment using 5% $H_2O$ at 973 K for 4 hours, can be confirmed, corroborating the hydrothermal stability of the Pt single atoms (FIG. 11, portion (d)). The Arrhenius plots (FIG. 11, portion (e), measured by kinetic studies) show that the apparent reaction energies of the Pt single atom catalysts before and after the steam pretreatment are very close (50.7 kJ/mol vs 53.2 kJ/mol). In addition, performing multiple cycles of the CO oxidation measurements (Supplement, FIG. S20), as well as stability test at 493 K for 50 hours, confirm the high stability of the Pt single atoms (FIG. 11, portion (f)).

Additionally, HTHP synthesized single atoms for reductive catalytic application of direct methane conversion can be demonstrated, where single atom catalysts exhibit good performance due to the coke resistance by preventing catalytic C—C coupling. A control sample can be synthesized via conventional impregnation (i.e., IMP) method by using the same material but thermally reducing at 573 K for 1 hour (Supplement, FIG. S21). FIG. 11, portion (g), and Supplement, FIG. S22, display the performance of Pt IMP ($T_s$=573 K) and HTHP synthesized Pt single atoms ($T_s$=1500 K) for direct CH$_4$ conversion at 973 K to various products, such as ethylene, ethane, propylene, propane, butene, and benzene over the total hydrocarbon products. The product distribution shows a high selectivity for C$_2$H$_4$, C$_2$H$_6$, and C$_6$H$_6$ (>90%) for Pt single atoms and no coke formation. In contrast, the Pt IMP sample shows severe coke formation even during the first hour of reaction, which could be ascribed to the continuous ensembles and aggregation of Pt sites at a high temperature (973 K). FIG. 11, portion (h), shows the superior stability of the HTHP synthesized Pt single atoms in CH$_4$ conversion with a stable turnover frequency (TOF) for 50 hours, in contrast to the quick drop of TOF for Pt IMP sample due to its dispersion instability at high temperature. The HTHP synthesized single atoms demonstrate roughly 1000-times higher TOF than Pt-nanocluster-supported on SiO$_2$ catalysts reported in the literature under similar conditions, manifesting the great efficiency of single atom catalysts. Such practical results demonstrate the superior thermal stabilities of single atoms synthesized by the HTHP process and their great potential for catalytic applications.

Figure 12:
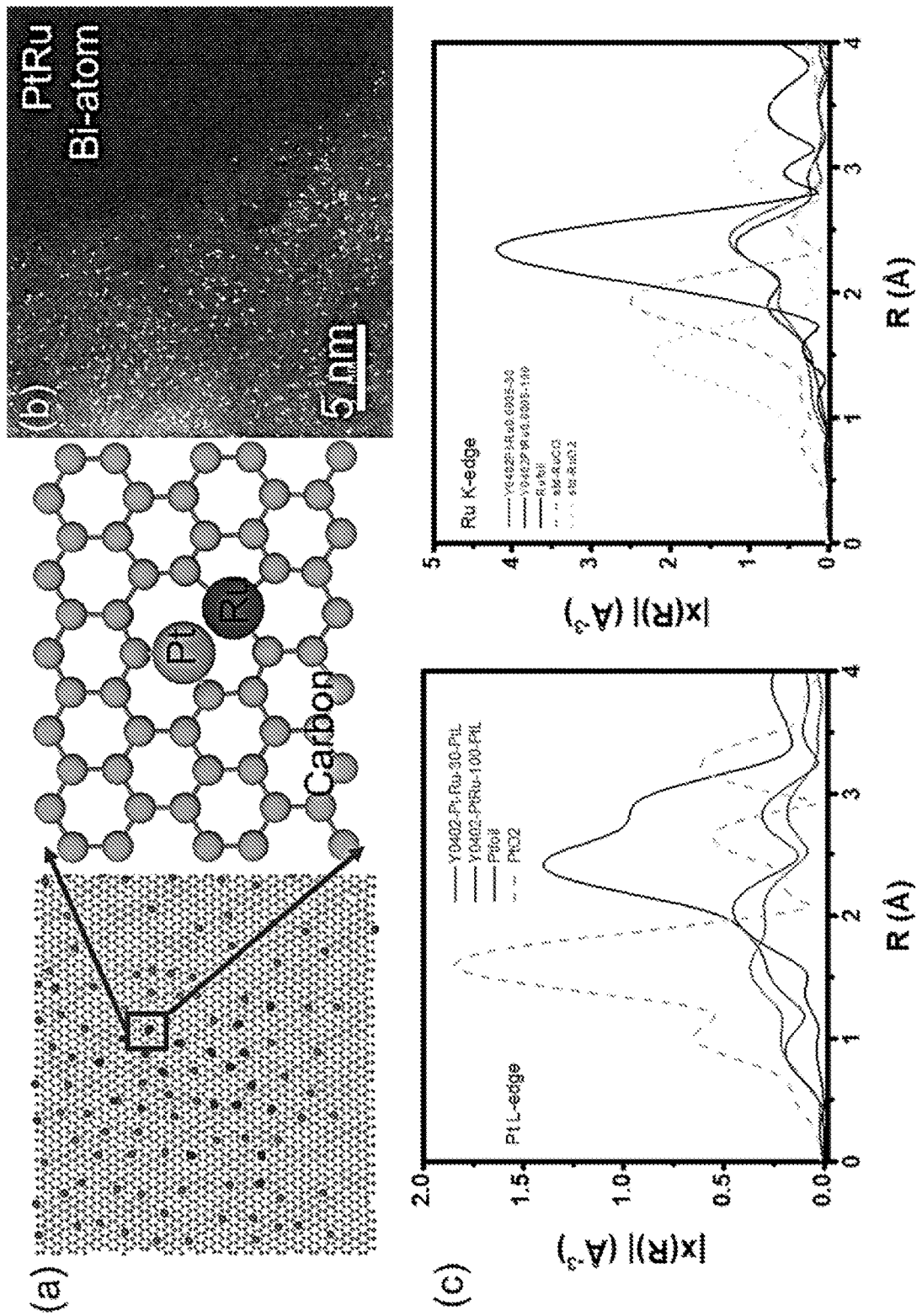
FIG. 12 shows diagrams and images relating to formation of Pt—Ru bi-atom on carbon nanofibers by a HTHP process, in accordance with aspects of the present disclosure.

Referring now to FIG. 12, there is shown diagrams and images relating to formation of Pt—Ru bi-atom on carbon nanofibers by the HTHP process. Portion (a) shows simulation efforts illustrating the dispersion of Pt—Ru into single atoms and formation of bi-metallic alloys. Portion (b) shows high resolution images of the atomic dispersion of Pt—Ru bi-atoms without clear segregation. Portion (c) shows the X-ray absorption profiles of Pt edge and Ru edge, showing that Pt—Ru in Pt—Ru bi-atoms are different from individual metal foils, indicating formation of Pt—Ru alloy bond.

Figure 13:
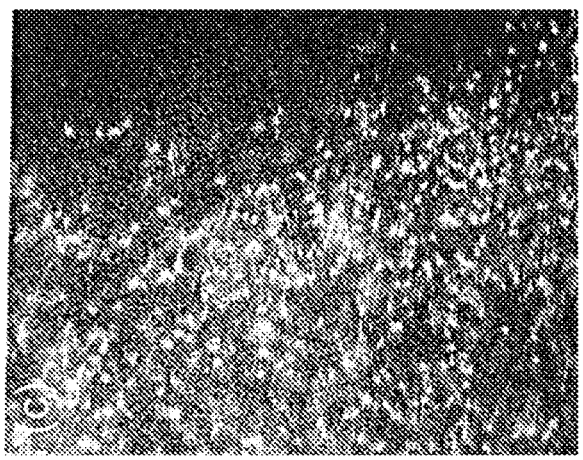
FIG. 13 is shows high resolution atomic images of formation of bi-atoms on carbon and $C_3N_4$ substrates by a HTHP process, in accordance with aspects of the present disclosure.
Figure 13:
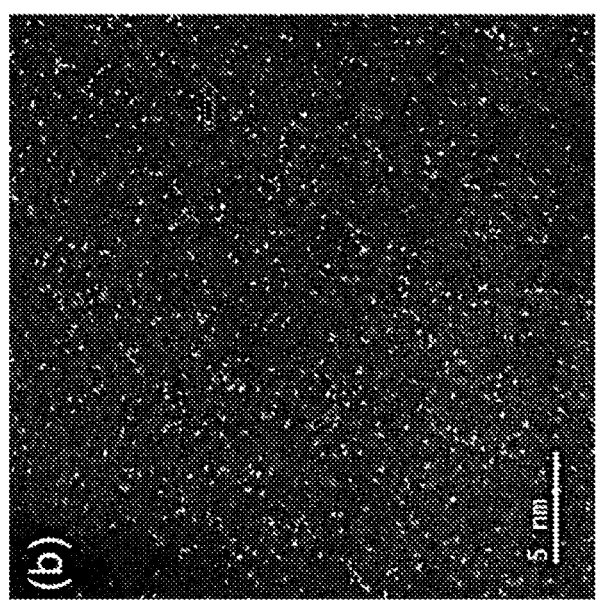
Figure 13:

FIG. 13 shows high resolution atomic images of formation of bi-atoms on carbon and C$_3$N$_4$ substrates by the HTHP process. Portion (a) shows Pt—Co bi-atoms dispersion on carbon nanofibers (CNF). Portion (b) shows Pt—Fe bi-atoms dispersion on reduced graphene oxide (RGO). Portion (c) shows Pt—Co bi-atom dispersion on C$_3$N$_4$ substrates. No cluster formation is clearly visible in each image/sample.

Accordingly, the present disclosure provides a high temperature heating pulse process for synthesizing single atom dispersions and multi-atom dispersions on substrates. The high temperature pulses operate to disperse clusters and synthesize single atom dispersion on the substrates. The single atoms are stabilized by the defects on the substrates and by bonding with the substrate. For clarity, it is noted that the single atom dispersion effectuated by the HTHP process may not disperse every cluster and some clusters may remain after the HTHP process.

The HTHP pulse configuration and pattern is flexible, as shown in FIG. 2, and the high temperature ($T_{high}$), low temperature ($T_{low}$), heating duration ($t_{high}$), cooling duration ($t_{low}$), heating rate ($R_{heating}$), cooling rate ($R_{cooling}$), and cycle numbers (n) can be individually varied for the HTHP process.

The heating configuration is also flexible and can include, without limitation, direct Joule heating, conduction heating, radiative heating, microwave heating, laser heating, and/or plasma heating, as shown in FIGS. 3, 8, and 14. Also, different cooling processes can be implemented, including, but not limited to, cooling by radiation and conduction, active cooling by conduction and convection, and/or active cooling by physical or chemical transitions that absorbs heat.

Multi-atom groupings/atomic alloys can be formed by sequentially/iteratively applying the HTHP process, which enables single atom dispersion for one specie at a time. In such a process, the atoms in a multi-atom group can be different or can be the same, and can be either pure metal or its compound. The substrates can be carbon-based materials, metals, ceramics, polymer, composites, oxides, and/or their combinations.

General atomic alloys with different elemental combinations can be synthesized by sequentially applying the HTHP process with different elements at each iteration. In the process, a single atom can be any element that can be dispersed into atomic form, including their compound formation. The substrates can be carbon-based materials, metals, ceramics, polymer, composites, oxides, and/or their combinations.

The synthesized single atoms and multi-atom groupings/atomic alloys can be used for many different applications, including, without limitation, thermochemical, electrochemical, and photochemical catalysis. Also, the synthesis of single atoms and atomic alloys can be used for fundamental study of atomic manipulation.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. The embodiments described and illustrated herein are exemplary, and variations are contemplated to be within the scope of the present disclosure. Various embodiments disclosed herein can be combined in ways not expressly described herein, and such combinations are contemplated to be within the scope of the present disclosure. Other elements, steps, methods, and techniques that are insubstantially different from those described above and/or in the appended claims are also intended to be within the scope of the disclosure.

What is claimed is:

1. A method of synthesizing atomic dispersions, comprising:
   positioning a loaded substrate, the loaded substrate comprising a substrate which is loaded with at least one of: a precursor of an element or a cluster of an element;
   applying at least one temperature pulse to the loaded substrate, wherein a pulse of the at least one temperature pulse applies a target temperature for a duration, wherein the target temperature is between 500 K and 4000 K, inclusive, and wherein the duration is between 1 millisecond and 1 minute, inclusive;
after the pulse, maintaining a cooling period; and
after the at least one temperature pulse, providing single atoms of the element dispersed on the substrate.

2. The method of claim 1, further comprising, during the pulse:
causing at least partial single atom dispersion of the element on the substrate; and
forming atom-substrate bonds to stabilize single atoms of the element on the substrate.

3. The method of claim 1, wherein each of the at least one temperature pulse applies the target temperature for the duration, the method further comprising:
after each of the at least one temperature pulse, maintaining a cooling period.

4. The method of claim 3, further comprising, during each of the at least one temperature pulse:
causing at least partial single atom dispersion of the element on the substrate; and
forming atom-substrate bonds to stabilize single atoms of the element on the substrate.

5. The method of claim 1, further comprising:
performing at least one iteration of:
loading the substrate with at least one of: a precursor of a further element or a cluster of a further element;
applying at least one further temperature pulse to the loaded substrate, wherein each of the at least one further temperature pulse applies the target temperature for the duration;
after each of the at least one further temperature pulse, maintaining a cooling period; and
after the at least one further temperature pulse, providing multi-atom dispersions of the element and the further element on the substrate.

6. The method of claim 5, wherein the element and the further element are one of: a same element or different elements.

7. The method of claim 1, wherein the element is one of Pt, Ru, or Co.

8. A system for synthesizing atomic dispersions, comprising:
a loaded substrate comprising a substrate which is loaded with at least one of: a precursor of an element or a cluster of an element;
at least one heating element; and
a controller configured to:
control the at least one heating element to apply at least one temperature pulse to the loaded substrate, wherein a pulse of the at least one temperature pulse applies a target temperature for a duration, wherein the target temperature is between 500 K and 4000 K, inclusive, and wherein the duration is between 1 millisecond and 1 minute, inclusive, and
after the pulse, maintain a cooling period,
wherein after the at least one temperature pulse, single atoms of the element are dispersed on the substrate.

9. The system of claim 8, wherein the pulse causes at least partial single atom dispersion of the element on the substrate and causes formation of atom-substrate bonds to stabilize single atoms of the atom on the substrate.

10. The system of claim 8, wherein the at least one heating element is configured to apply one of: direct Joule heating, conduction heating, radiative heating, microwave heating, laser heating, or plasma heating.

11. The system of claim 8, wherein the controller is configured to:
control the at least one heating element to, for each of the at least one temperature pulse, apply the target temperature for the duration, and
after each of the at least one temperature pulse, maintain a cooling period.

12. The system of claim 11, further comprising a conveyor holding the loaded substrate,
wherein the controller is configured to control the conveyor to convey the loaded substrate for heating by the at least one heating element,
wherein controlling the at least one heating element to apply the at least one temperature pulse to the loaded substrate includes:
controlling the at least one heating element to maintain the temperature, and
controlling a speed of the conveyor to expose portions of the loaded substrate to each of the at least one heating element for the duration.

13. The system of claim 12, wherein the at least one heating element includes a plurality of heating elements,
wherein the plurality of heating elements are positioned apart such that conveying the portions of the loaded substrate on the conveyor between each of the plurality of heating elements implements the cooling period.

14. The system of claim 13, wherein the loaded substrate is a contiguous strip, wherein the conveyor continuously conveys the contiguous strip of loaded substrate.

15. The system of claim 11, wherein the loaded substrate is in one of: powder form or droplet form, the system further comprising a projection device for projecting the loaded substrate through the at least one heating element,
wherein controlling the at least one heating element to apply the at least one temperature pulse to the loaded substrate includes:
controlling the at least one heating element to maintain the temperature, and controlling a projection speed of the projection device to expose the loaded substrate to each of the at least one heating element for the duration.

16. The system of claim 15, wherein the at least one heating element includes a plurality of heating elements,
wherein the plurality of heating elements are positioned apart such that travel of the projected loaded substrate between each of the plurality of heating elements implements the cooling period.

* * * * *